United States Patent [19]

Buikema

[11] 4,029,885

[45] June 14, 1977

[54] CATIONIC STARCH SIZING

[75] Inventor: Peter D. Buikema, Oak Park, Ill.

[73] Assignee: Nalco Chemical Company, Oak Brook, Ill.

[22] Filed: Dec. 31, 1975

[21] Appl. No.: 645,778

[52] U.S. Cl. .................................. 536/50; 427/391; 427/395; 428/534

[51] Int. Cl.² .......................................... C08B 31/08

[58] Field of Search ..................... 536/50; 428/534; 427/391, 395

[56] References Cited

UNITED STATES PATENTS

| | | |
|---|---|---|
| 2,876,217 | 3/1959 | Paschall ............................... 536/50 |
| 3,017,294 | 1/1962 | Meisel ................................. 536/50 |
| 3,598,623 | 8/1971 | Powers et al. ........................ 536/50 |
| 3,666,751 | 5/1972 | Jarowenko et al. ................. 536/50 |
| 3,854,970 | 12/1974 | Aitken ................................ 536/50 |

*Primary Examiner*—Melvyn I. Marquis
*Attorney, Agent, or Firm*—John G. Premo; Robert A. Miller; Barry W. Sufrin

[57] ABSTRACT

Paper and other cellulose materials are sized with a cationic starch which comprises the reaction product between an anionic starch and a condensate of epichlorohydrin with an equimolar quantity of dimethylamine, in which up to 30% molar ammonia may be substituted for a like molar amount of dimethylamine.

10 Claims, No Drawings

CATIONIC STARCH SIZING

BACKGROUND OF THE INVENTION

1. Field of the Invention

Various types of modified starches have been used in treating paper in order to improve its strength and surface characteristics. Modified starch additives are commonly introduced into the "wet end" of the manufacturing process and they are also commonly coated onto formed cellulosic sheets in size presses and other types of coating apparatus. Since at least the 1960's, the utilization of cationic starches as wet end additives has become popular due to certain important advantages which they exhibit in comparison with both unmodified starches and other types of modified starches.

In these times of increasing awareness of the environmental aspects of manufacturing processes, it has been noted that cationic starches reduce BOD pollution problems. Cationic starches help retain fiber fines. They exhibit superior absorbancy onto anionic cellulosic fibers and onto common pigments. This improved absorbance and attendant superior pigment binding efficiency means that lesser amounts of cationic starch can be used to meet sheet specifications. Since lesser amounts of starch are used and a greater percentage of the starch used is bound onto the cellulose fiber, lesser amounts of BOD-producing starch will be present in effluents produced during paper manufacture.

These interesting and important properties of cationic starches are believed to be due to attraction between the starch and both anionically charged pigment and fiber resulting in improved chemical anchoring of coatings to the cellulose. Of course, the improved anchoring exhibited by cationic starches would be desirable at the coating stage as well as at the wet end. Indeed, it has been found that when cationic starch is used as a surface size, more starch is retained on or near the surface of the sheet than is retained with conventional starches. Thus, less starch is needed to maintain surface strength and quality. Since the cationic starch is tightly bound to the paper fiber, it is not removed during the repulping of broke. Hence, starch from the broke is recovered in the papermaking operation rather than being lost in the mill effluent. This attachment to the fiber coupled with the fact that reduced amounts of cationic starch are needed at the size press results in significant reduction in mill effluent BOD.

In addition, cationic surface sizing results in improved printing properties. These improved properties are believed to be due to a combination of fiber bonding and surface orientation resulting in more uniform starch concentration on the paper surface, and hence more uniform ink receptivity and improved ink holdout. The improved fiber bonding provides a strong paper surface. Among the various improved printing characteristics experienced with the use of cationic starches are: better printing uniformity, better print definition, greater depth of color, reduced ink show-through, fewer pick-outs on offset press and reduced dusting.

In spite of their many advantages, in practice cationic starches have been found to have a serious drawback when used in coating or sizing. Cationic starches are generally manufactured by an approximately 12 hour process of swelling starch particles in a slurry using an alkaline agent to raise the pH, reacting the starch with tertiary or quaternary amines, neutralizing, washing and filtering. Although the presence of small amounts of the alkaline agent contributes to the swelling of the starch particles, the bulk of the alkaline agent is present in order to render the non-ionic end groups of the starch anionic thereby facilitating the addition of the cationic material which gives the starch its cationic character. As discussed below, considerable amounts of alkaline agent are required in order to accomplish the latter objective. The use of large amounts of acid to neutralize the alkaline agent is expensive and impractical and tends to introduce significant amounts of unwanted salts. The presence of unneutralized alkaline agent, on the other hand, significantly discolors the starch thereby impairing the color and brightness of the starch-coated sheet.

Since the present invention has eliminated the need for the alkaline agent to facilitate the starch acceptance of cationic material, both the neutralization and the significant discoloration problems have been eliminated. Small amounts of alkaline agent may optionally be employed in order to improve starch swelling without impairing the coloration of the sheet or the cationic addition to the starch. The present invention comprises an important addition to the art — it discloses a new and useful paper coating agent which eliminates problems generally inherent in cationic starch coating agents.

2. Description of the Prior Art

Various cationic starches have heretofore been described. Among the patented prior art, the following patents are of possible interest:

U.S. Pat. No. 2,813,093 — Caldwell et al., (National Starch) — 1957

Granular starch plus a tertiary amine hydrochloride (e.g., b-diethyl aminoethyl chloride).

U.S. Pat. No. 2,876,217 — Paschall (Corn Products) — 1959

Granular starch ethers produced by reaction of a tertiary amine (e.g., trimethyl amine) with epichlorohydrin (epi) and suppressing cross-linking by vacuum or solvent elimination of excess epi.

U.S. Pat. No. 2,995,513 — Paschall et al., (Corn Products) — 1961

Gelatinized starch ethers produced by epichlorohydrin plus a tertiary amine or a quaternary amine salt (e.g., trimethyl amine hydrochloride). The degree of substitution was D.S.=0.3 to 0.5.

Canada Pat. No. 715,566 — Paschall et al., (Corn Products) — 1965

Granular or ungelatinized starch ether prepared from an epi-tertiary amine condensate where the tertiary amine contains two or three methyl groups and is condensed equimolar with epichlorohydrin; also, there is a provision to remove unreacted epi by vacuum or solvent extraction, thus preventing cross-linking by unreacted epi.

Australia Pat. No. 404,812 — Brown (Australian Paper Manufacturers Limited) — 1969

Gelatinized starch reacted in situ with an epichlorohydrin-ammonia condensation product.

U.S. Pat. No. 3,666,751 — Jarowenko et al., (National Starch) — 1972

Liquid starch products similar to Brown above prepared by reacting starch with epichlorohydrin-ammonium hydroxide condensates.

U.S. Pat. No. 3,674,725 — Aitken et al., (Nalco) — 1972

Method of cationization of starch which comprises reacting starch under alkaline conditions with a polymer formed from polyepichlorohydrin and an amine (e.g., trimethylamine, dimethylamine, etc.).

U.S. Pat. No. 3,738,945 — Panzer et al. —

Utilizes reaction products of epichlorohydrin and secondary amines.

U.S. Pat. No. 3,884,909 — Kightlinger et al., (Standard Brands) — 1975

A cationic starch suitable for paper sizing produced by (1) reacting starch with an alkali - catalyzable cross-linking agent and the reaction product of the cross-linking agent with ammonia or with an amine and (2) depolymerizing the resulting cationic cross-linked product.

U.S. Pat. No. 3,854,970 — Aitken (Nalco) — 1974

A cationic starch useful as a wet end additive produced by treating starch with an alkaline agent and a condensate of generally equimolar quantities of epichlorohydrin and dimethylamine wherein up to 30% molar ammonia may be substituted for a like amount of the dimethylamine. Usefulness as a wet end pulp additive is disclosed in the dosage range of 3-50 pounds per ton.

The present invention differs from most of the prior art cited in that it is designed for a liquid cationic starch treated either with a binary condensate of epichlorohydrin (EPI) and dimethylamine (DMA) or for a modified ternary condensate wherein up to 30% molar ammonia is substituted for a like molar amount of DMA. In contrast 3,666,751 above is a binary condensate of EPI and ammonium hydroxide and the closest teaching to this invention is believed to be Column 4, lines 35-37, which indicates a possible inclusion of up to 15% of a cross-linking inhibitor specifying ethylamine and dimethylamine. 3,674,725 above produces a cationic starch additive from related starting materials but used polyepichlorohydrin instead of the present EPI.

The present invention also differs significantly from 3,854,970. It will be noted that 3,854,970 requires the use of a strong alkaline agent as discussed in Column 3, lines 17-23. It is explained there that the minimum pH must be at least 11, and that, when using a preferred alkali metal hydroxide such as NaOH, 5-8% by weight is applied. It is further explained in the 3,854,970 patent that 3-50 pounds per ton of the cationic starch are useful in wet end treatment (Column 3, lines 53-54). This corresponds to an NaOH level of from 0.0075-2.5%. Such levels of alkaline agent do not adversely affect paper coloration. However, the quantities of cationic starch required at the size press, which are far greater than the quantities required for wet end treatment, significantly discolor the paper product and otherwise adversely affect its properties.

Hence, the present invention entails a method of paper sizing utilizing a cationic starch similar to that disclosed in 3,854,970. The present invention, however, differs significantly from 3,854,970 in that the requirement for an alkaline agent has been eliminated. Thus, the present invention makes available to the art an important cationic starch which heretofore was unavailable due to the adverse affects of high amounts of alkaline agent which were heretofore necessary to produce cationic starch.

SUMMARY OF THE INVENTION

The Epichlorohydrin-Dimethylamine Condensate

The EPI-DMA condensate which is used to react with the starch is prepared by admixing EPI with DMA in approximately equimolar proportions utilizing reaction condensate conditions of temperatures about 60°-80° C for one hour under alkaline pH conditions, as for example using 5% NaCl or a preferred range of 5-8% alkali metal hydroxide. The product is subsequently acidified with a mineral acid such as HCl to a pH of about 3.0, thus producing an amine salt or a quaternary ammonium anion site on the nitrogen of the DMA moiety. The basic condensate is a one-to-one reaction of EPI wherein the epoxy ring is attached or opened by DMA or ammonia to form the basic condensate which may further condense in irregular linear fashion.

With reference to the term epichlorohydrin (EPI), it is understood for purposes of this invention that the brom analog, epibromhydrin, may be utilized in place of the preferred EPI. The variation of reaction conditions to produce the ternary compositions of the present invention, e.g., EPI-DMA-ammonia, may be achieved by adding to the mix up to 30% molar of ammonium hydroxide utilized as concentrated ammonium hydroxide (26° Be). The ternary compositions embodying 10% ammonia and 20% ammonia are preferred in this invention, and the efficacy of these compositions is believed due to the high proportion of quaternary ammonium groups which is effective for starch cationization at higher pH levels than a composition derived entirely from ammonia and EPI. The present condensates thus show particular advantages over starches modified with tertiary amines or tertiary amine polymers.

The proportions of EPI and DMA which are used at a preferred equimolar ratio may vary within the range of about 0.8-3 mols of EPI to 1 mol of DMA. Condensates utilizing greater than 3 tend to cross-link the starch. On the other hand, condensates using less than 0.8 mols of EPI per mol of DMA lack sufficient reactive sites. Where utilized herein broadly the term "condensate" refers to both the binary EPI-DMA and the ternary EPI-DMA-$NH_3$ condensates described and claimed herein.

Preparation and Treatment of the Liquid Cationic Starch

The cationic starch utilized in the present invention is produced by treating gelatinous anionic starches. Useful anionic starches include commercially available oxidized starches and ammonium persulfate process pearl starches.

Calculated on a dry starch basis, the EPI-DMA and EPI-DMA-$NH_3$ condensate additives are utilized in amounts of about 1-10% and preferably 2-6% by weight based on the granular anionic starch. Although the condensate may be added at any time during the gelatinization, it is preferably added very late in the gelatinization and more preferably it is added after gelatinization is complete.

The condensate may be added to the gelatinized starch in a separate step wherein reaction temperatures of 30°-100° C are maintained for a period of 10 minutes to 24 hours until reaction is complete. The extent of reaction will, of course, depend upon the reaction temperature and the agitation to which the starch mixture is subjected. The mix may contain substances useful to preserve the starch against microbial attack including, for example formaldehyde and phenols.

The cationic starch thus produced is a liquid starch rather than a dry granular or solid starch. The reactant starch may be selected from a number of anionic starches including ammonium persulfate process pearl starches, and various commercially available oxidized starches such as the STAYCO starches which are products of the A. E. Staley Mfg. Co. It should be noted that in paper surface sizing, it is desirable to use starches of molecular weights substantially lower than those employed in wet end additives. Lower molecular weight starches are used in sizing because their lower viscosity improves penetration into the cellulosic material being treated. Lower molecular weight starches, however, are more susceptible to discoloration caused by alkaline agents than are high molecular weight starches. Hence, the presence of significant amounts of alkaline agents is of increased concern during the paper coating operation.

USE IN PAPER SIZING

As discussed earlier, the cationic starch described above is both useful and practical in the surface treatment of cellulosic materials. This modified starch constitutes an important surface sizing material. Usually, the amounts employed will be at least 30 pounds of the cationic starch per ton of cellulosic material, which corresponds to 1.5% by weight. Ordinarily, the dosage will be within the range of 1.5–12.5% by weight, and preferably it will be within the range of 3.0–7.5%.

The cationic starch may be applied by any of the common surface treatment processes well known in the art, including processes utilizing a vertical or horizontal size press, tub sizing apparatus or calender sizing, etc. Among the improved paper properties attainable by using the cationic starch are increases in the surface strength and opacity, as well as increases in the density or reduction in the porosity of the cellulose fibers, increases in water repellancy and improved resistance to ink penetration. The invention is especially useful for the preparation of printing papers. It can also be used in making board grade paper used in making liners of single faced or double faced corrugated board, or in the corrugating medium itself.

PREFERRED EMBODIMENT

Although dosages will vary depending on the actual and desired characteristics of the cellulosic materials being treated, in a preferred embodiment, the dosage of cationic starch would be about 100 pounds per ton. This contemplates the use of Stayco S which has been treated with 5% by weight of the EPI-DMA-NH$_3$ condensate described in Example 1 below.

EXAMPLE 1

PREPARATION OF EXEMPLARY CONDENSATES - EPI-DMA-NH$_3$10

In a pilot plant set up embodying a 2000 gallon batch size reactor, a 250 gallon weight tank and an optional recycle loop with an in-line viscometer and recorder, the following materials were utilized in weight percent and pounds noted:

| Raw Materials | | |
|---|---|---|
| Soft Water | 37.459 | 7130 |
| 60% Dimethylamine Solution | 22.773 | 4334 |
| Epichlorohydrin | 34.315 | 6531 |
| Aqua Ammonia 26° Be (Spec. Grav. 0.895–0.900 at 20° C) | 2.046 | 389 |
| 50% Caustic | 1.981 | 377 |
| 37% Hydrochloric Acid | 1.426 | 271 |
| | 100.000 | 19032 |

After preliminary cleaning of the reactor and leak testing, 7130 pounds or 855 gallons of soft water were added to the reactor and then the reactor was charged with 389 pounds of ammonia, using reactor vacuum to suck material from the drum. Then 4334 pounds of 60% DMA solution was added to the reactor. EPI was added at about 20 pounds per minute to the full amount of 6531 pounds.

The temperature was monitored to about 80° C (176° F) and while the EPI was being added (about 6 hours). At the end of the EPI addition, the temperature was held at 80° C for about half an hour and then 377 pounds of 50% NaOH was added and pH and viscosity checks were made at half hour to one hour intervals.

When condensate reaction was complete to 600–700 cps as measured by viscosity determination, the HCl 37% was added to acidify to a pH of 3.0 and the product was cooled. The product produced was a condensate from 90% DMA - 10% NH$_3$ - EPI.

The product produced was a condensate denoted B from 90% DMA, 10% NH$_3$ EPI (equimolar). Additional runs using this procedure produced the following additional condensates set out below:

A. 100% DMA, 0% NH$_3$, EPI
B. See above
C. 80% DMA, 20% NH$_3$, EPI
D. 70% DMA, 30% NH$_2$, EPI The above percentages are on a molar basis.

EXAMPLE 2

EVALUATION OF CATIONIC STARCHES

In the following tests, various commercially available starches listed were treated with varying amounts of an EPI-DMA-NH$_3$ condensate prepared according to the method of Example 1. With the exception of tests 5–8, in each case the condensate was added after gelatinization of the starch was completed with a minimum residence time before using the condensate-treated starch of ten minutes.

In order to determine the effectiveness of the cationic starch disclosed herein in sizing a printing paper, sheets of a commercial 45 pound offset grade base paper made from hard wood and soft wood kraft pulp containing ¼% rosin and ½% alum were sized on a coating machine (Keegan coater) and dried on a drum dryer (Noble and Wood). Tests of ink penetration, wax pick and I.G.T. surface strength were run on the sized paper. In addition, the paper was repulped and filtered and the filtrate was tested in order to compare starch content and BOD related characteristics of the filtrate.

Ink penetration was determined on a Hercules ink sizing tester which gives the number of seconds required for the ink to penetrate to a predetermined end point. A pH 2 water based ink was used in the tester. In the ink penetration test the more effective the material, the greater the number of seconds required for penetration.

The relative surface strength of paper sized with various starches was determined under a "wax pick" test which is TAPPI Standard No. T 459, and the "I.G.T." test which is known as TAPPI Standard No. T 499. The "wax pick" test entails the application and subsequent removal of waxes of varying hardness to the sized paper. The hardest wax which will not remove surface fibers is determined and its hardness number is assigned to the particular sizing preparation. Higher "wax pick" numbers are desirable because they correspond to stronger surface paper. The I.G.T. test is concerned with determining the surface strength of paper under conditions similar to those experienced in a printing press. This test entails passing a strip of sized paper moving at varying rates against an ink disc. The rate at which the ink disc begins to pick fibers out of the sized paper determines the I.G.T. rate: higher rates correspond to stronger paper surfaces.

As discussed earlier, the environmental ramifications of releasing starch into paper plant effluents are currently of great concern. Tests were run in order to determine the relative starch release rates and BOD characteristics of repulped coated papers. The determination of relative starch retention entailed merely a colorimetric determination of starch content based upon the use of starch sensitive dyes. The starch content measured was that present in the filtrate of repulped coated paper. BOD characteristics were determined by treating the filtrate obtained from the broke produced from coated papers with microbiologic organisms, diluting with water containing trace nutrients, and monitoring the level of oxygen initially and after 5 days. The decrease in oxygen over the five day period is reported as an indication of BOD.

The data obtained using various different starches and varying amounts of EPI-DMA-NH₃ condensate are reported in Table I below. As will be noted by examining this Table, the cationic starch produced according to the teaching of the present invention when used to coat paper will produce a paper with good surface strength, good resistance to sheet penetration and reduced BOD in the broke.

I claim:

1. A method of making gelatinized cationic starch useful in sizing and coating cellulosic materials which comprises the steps of:

A. gelatinizing a granular anionic starch;
B. adding to said starch during the course of gelatinization 1–10% by weight of a condensate of generally equimolar quantities of epichlorohydrin and dimethylamine wherein the percentage of said condensate is calculated from granular anionic starch;
C. completing said gelatinization; and then,
D. recovering the gelatinized cationic starch.

2. The method of claim 1 wherein 2–6% by weight of the condensate is added, based on the granular anionic starch.

3. The method of claim 1 wherein up to 30% molar ammonia is substituted for the dimethylamine.

4. A method of making gelatinized cationic starch useful in surface sizing and coating of cellulosic materials which comprises the steps of:

A. producing gelatinous anionic starch from granular anionic starch;
B. reacting the gelatinous anionic starch over a period of 10 minutes to 24 hours and at a temperature of 30°–100° C with 1–10% by weight of a condensate of generally equimolar quantities of epichlorohydrin and dimethylamine wherein the percentage of said condensate is calculated from the granular anionic starch; and,
C. recovering the gelatinized cationic starch.

5. The method of claim 4 wherein 2–6% by weight of the condensate is added, based on the granular anionic starch.

6. The method of claim 4 wherein up to 30% molar ammonia is substituted for the dimethylamine.

7. A method of surface sizing and coating cellulosic materials which comprises coating said cellulosic materials with 1.5–12.5% by weight of the composition of claim 1.

8. A method of surface sizing and coating cellulosic materials which comprises coating said cellulosic materials with 3.0–7.5% by weight of the composition of claim 1.

9. A method of surface sizing and coating cellulosic materials which comprises coating said cellulosic materials with 1.5–12.5% by weight of the composition of claim 4.

10. A method of surface sizing and coating cellulosic materials which comprises coating said cellulosic materials with 3.0–7.5% by weight of the composition of claim 4.

TABLE I - TEST DATA

| Test Starch | | EPI-DMA-NH₃ (% By Weight) | Pick-Up (lb/ton) | Average Hercules Ink Size (80% Reflectance) | Wax Pick | Starch in Filtrate (Relative Colorimetric Determination**) | I.G.T. No. 7 Ink |
|---|---|---|---|---|---|---|---|
| 1 | Claro 5671 Oxidized Starch | — | 107 | 17 | 18/20 | 122 | — |
| 2 | Claro 5671 Oxidized Starch | 5 | 105 | 33 | 18/20 | 76 | — |
| 3 | Claro 5671 Oxidized Starch | 10 | 126 | 43 | 18/20 | 44 | — |
| 4 | Claro 5671 Oxidized Starch | 15 | 145 | 50 | 18/20 | 32 | — |
| 5* | Claro 5671 Oxidized Starch | — | 107 | 16 | 18/20 | 92 | — |
| 6* | Claro 5671 Oxidized Starch | 5 | 105 | 22 | 18/20 | 60 | — |
| 7* | Claro 5671 Oxidized Starch | 10 | 126 | 33 | 18/20 | 56 | — |
| 8* | Claro 5671 Oxidized Starch | 15 | 146 | 40 | 18/18 | 48 | — |
| 9 | Cargill Oxidized Starch | — | 100 | 23 | 18/20 | — | 65/75 |
| 10 | Cargill Oxidized Starch | 5 | 100 | 27 | 18/20 | — | 75/80 |
| 11 | Cargill Oxidized Starch | 10 | 100 | 32 | 18/20 | — | 78/80 |
| 12 | Cato 67 Cationic Starch (15% solids) | — | 305 | 24 | 18/18 | 105 | — |
| 13 | Cato 67 Cationic Starch (13% solids) | — | 188 | 19 | 18/18 | 38 | — |
| 14 | Cato 67 Cationic Starch (10% solids) | — | 139 | 13 | 18/18 | 22 | — |
| 15 | Cato 67 Cationic Starch (8.5% solids) | — | 100 | 11 | 18/18 | 10 | — |
| 16 | Cato 67 Cationic Starch (7% solids) | — | 45 | 4 | 18/16 | 5 | — |
| 17 | Cato 67 Cationic Starch | — | 100 | 14 | 18/20 | — | 70/75 |
| 18 | Claro 5592 Oxidized Starch | — | 104.6 | — | — | 258 | — |
| 19 | Claro 5592 Oxidized Starch | 5 | 99.6 | — | — | 173 | — |
| 20 | Claro 5592 Oxidized Starch | 10 | 107.2 | — | — | 134 | — |
| 21 | Claro 5592 Oxidized Starch | 15 | 109.2 | — | — | 83 | — |

*EPI-DMA-NH₃ added to starch cook during gelatinization
**Runs 18–21 report 5 day BOD data rather than colorimetric starch determination